(No Model.)

H. W. WALKER.
CUPEL MOLD.

No. 284,693. Patented Sept. 11, 1883.

Witnesses:

Inventor.
Henry William Walker

UNITED STATES PATENT OFFICE.

HENRY W. WALKER, OF SAN FRANCISCO, CALIFORNIA.

CUPEL-MOLD.

SPECIFICATION forming part of Letters Patent No. 284,693, dated September 11, 1883.

Application filed August 17, 1882. (No model.)

*To all whom it may concern:*

Be it known that I, HENRY WILLIAM WALKER, of the city and county of San Francisco, and State of California, have invented a new and useful Improvement in Cupel-Molds, which improvement is fully set forth in the following specification, reference being had to the accompanying drawings.

Figure 1:
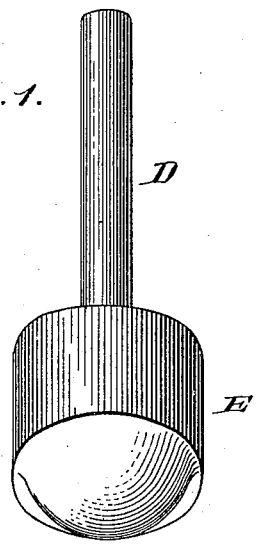
Figure 2:
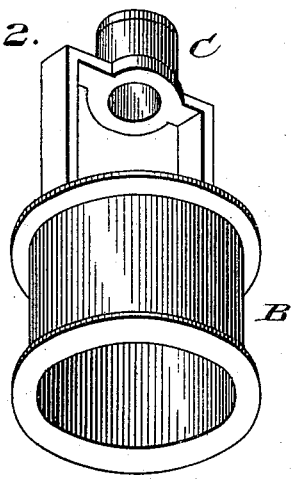
Figure 3:
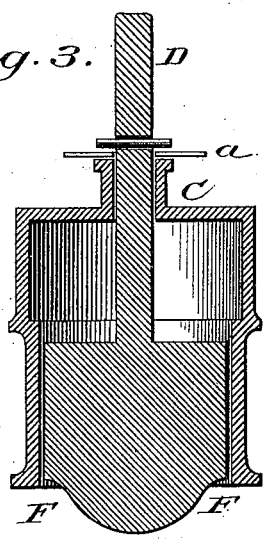
Figure 4:
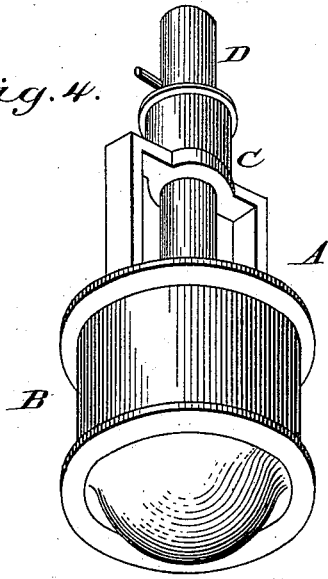

Figure 1 is a perspective view of the plunger. Fig. 2 is a perspective view of the mold. Fig. 3 is a sectional view of the plunger and mold combined. Fig. 4 is a perspective view of the mold with the plunger therein.

The object of my improvement is to make a cupel-mold better and more serviceable, in which a continuous working is effected, and in which all catching or sticking of the plunger in the cylinder or mold in its descent onto and from the bone-ash is obviated.

In Fig. 4, A represents the cupel-mold ready for use.

B is the cylinder or casing of the mold, in which is located the plunger E, said plunger being concave on its outer end, so as to give the proper form to the cupel. The plunger E is also provided with a spindle, D, which is supported in a guide or bridge, C, and keeps the spindle centrally located in the mold, while a pin, a, passing through the spindle D, holds the plunger in its proper position in the mold, and regulates the thickness of the cupel or other article to be produced.

Instead of the pin a, I may use any kind of spring-fastening for holding the plunger at any desired point in the cylinder, so as to regulate the thickness of the cupel or other article; or the cylinder may be so constructed as to act as guide for the plunger by further increasing its depth.

The operation of my device is as follows: The mold, with the plunger therein, is placed with the spindle D resting on the bench or table. The bone-ash, having been properly mixed and made into a plastic condition, is placed over the convex end of the plunger and properly pressed into the rounded or rim-forming portions F. When the cupel is formed, the pin a is withdrawn, which allows the plunger to be pushed through the cylinder B far enough to allow the newly-formed cupel to be removed.

Having thus described my invention, what I claim, and desire to secure by Letters Patent, is—

1. A mold for making cupels, consisting of a spindle and a plunger or convex former located therein, said plunger being provided with adjusting devices, by which the thickness of the cupel is determined.

2. In a cupel-mold, the cylinder B, provided with the bridge C, in combination with an adjustable plunger, as and for the purposes set out.

3. A cupel-mold the plunger or former of which is provided with concave portions F F, whereby rounding portions are formed on the edges of the cupel, as and for the purposes set forth.

HENRY WILLIAM WALKER.

Witnesses:
SAMUEL J. CLARKE,
ALEX. GAMBLE.